(12) United States Patent
Watanabe

(10) Patent No.: US 11,161,389 B2
(45) Date of Patent: Nov. 2, 2021

(54) VEHICLE AIR-CONDITIONING METHOD AND VEHICLE AIR-CONDITIONING DEVICE

(71) Applicant: Nissan Motor Co., Ltd., Kanagawa (JP)

(72) Inventor: Takashi Watanabe, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/629,261

(22) PCT Filed: Jul. 7, 2017

(86) PCT No.: PCT/JP2017/025026
§ 371 (c)(1),
(2) Date: Jan. 7, 2020

(87) PCT Pub. No.: WO2019/008768
PCT Pub. Date: Jan. 10, 2019

(65) Prior Publication Data
US 2020/0223283 A1 Jul. 16, 2020

(51) Int. Cl.
*B60H 1/00* (2006.01)

(52) U.S. Cl.
CPC ..... *B60H 1/00742* (2013.01); *B60H 1/00842* (2013.01); *B60H 1/00064* (2013.01);
(Continued)

(58) Field of Classification Search
CPC ............ B60H 1/00742; B60H 1/00842; B60H 1/00064; B60H 1/00835; B60H 1/00971;
(Continued)

(56) References Cited

U.S. PATENT DOCUMENTS 6,012,297 A * 1/2000 Ichishi ............... B60H 1/00871
165/203
6,386,965 B1 5/2002 Greenwald et al.
(Continued)

FOREIGN PATENT DOCUMENTS

DE 102011084439 A1 4/2013
DE 102015115066 A1 3/2016
(Continued)

*Primary Examiner* — Travis C Ruby
(74) *Attorney, Agent, or Firm* — Osha Bergman Watanabe & Burton LLP

(57) ABSTRACT

A vehicle air-conditioning device includes: an air-conditioning device having an all-seat air-conditioning mode in which air-conditioned air is blown out to occupants of all seats in a vehicle cabin and an individual air-conditioning mode in which the air-conditioned air is blown out to some of the occupants of all seats; a selection device used to select the all-seat air-conditioning mode and the individual air-conditioning mode; and a controller configured to control the air-conditioning device in an air-conditioning mode selected in the selection device. When the vehicle is activated by a remote starter device configured to remotely activate the vehicle, the controller controls the air-conditioning device by switching the air-conditioning mode to the all-seat air-conditioning mode even when the air-conditioning mode selected at previous turning-off of an ignition device is the individual air-conditioning mode.

3 Claims, 8 Drawing Sheets

(52) U.S. Cl.
CPC .............. *B60H 2001/00092* (2013.01); *B60H 2001/00135* (2013.01); *B60H 2001/00192* (2013.01)

(58) Field of Classification Search
CPC ............ B60H 1/00657; B60H 1/00892; B60H 2001/00092; B60H 2001/00135; B60H 2001/00192; B60H 2001/002
See application file for complete search history.

(56) References Cited

U.S. PATENT DOCUMENTS

| | | | |
|---|---|---|---|
| 9,862,247 B2 | 1/2018 | Perkins | |
| 10,179,499 B2 | 1/2019 | Perkins | |
| 10,369,865 B2 | 8/2019 | Perkins | |
| 2009/0133417 A1* | 5/2009 | Egawa | B60H 1/00742 62/132 |
| 2009/0193821 A1* | 8/2009 | Ozeki | B60H 1/00742 62/89 |
| 2009/0193825 A1* | 8/2009 | Hara | B60H 1/00657 62/132 |
| 2010/0072290 A1* | 3/2010 | Dage | B60H 1/00828 236/51 |
| 2012/0267442 A1* | 10/2012 | Choi | G05D 23/1902 236/51 |
| 2015/0099443 A1* | 4/2015 | Hirabayashi | B60H 1/00657 454/75 |
| 2015/0328958 A1 | 11/2015 | Winget, Jr. et al. | |
| 2015/0343882 A1* | 12/2015 | Satzger | B60H 1/00778 165/202 |
| 2015/0375599 A1* | 12/2015 | Esposito | B60H 1/00828 701/36 |
| 2016/0082808 A1 | 3/2016 | Perkins | |
| 2016/0137028 A1* | 5/2016 | Trego | B60H 1/00871 165/203 |
| 2016/0159200 A1* | 6/2016 | Kim | B60H 1/00971 701/36 |
| 2016/0207374 A1* | 7/2016 | Gauthier | B60H 1/00778 |
| 2017/0057322 A1* | 3/2017 | Kava | B60H 1/00778 |
| 2018/0093546 A1 | 4/2018 | Perkins | |
| 2018/0093547 A1 | 4/2018 | Perkins | |

FOREIGN PATENT DOCUMENTS

| | | |
|---|---|---|
| JP | 2007-015549 A | 1/2007 |
| JP | 2013-224151 A | 10/2013 |
| JP | 2014-113849 A | 6/2014 |

* cited by examiner

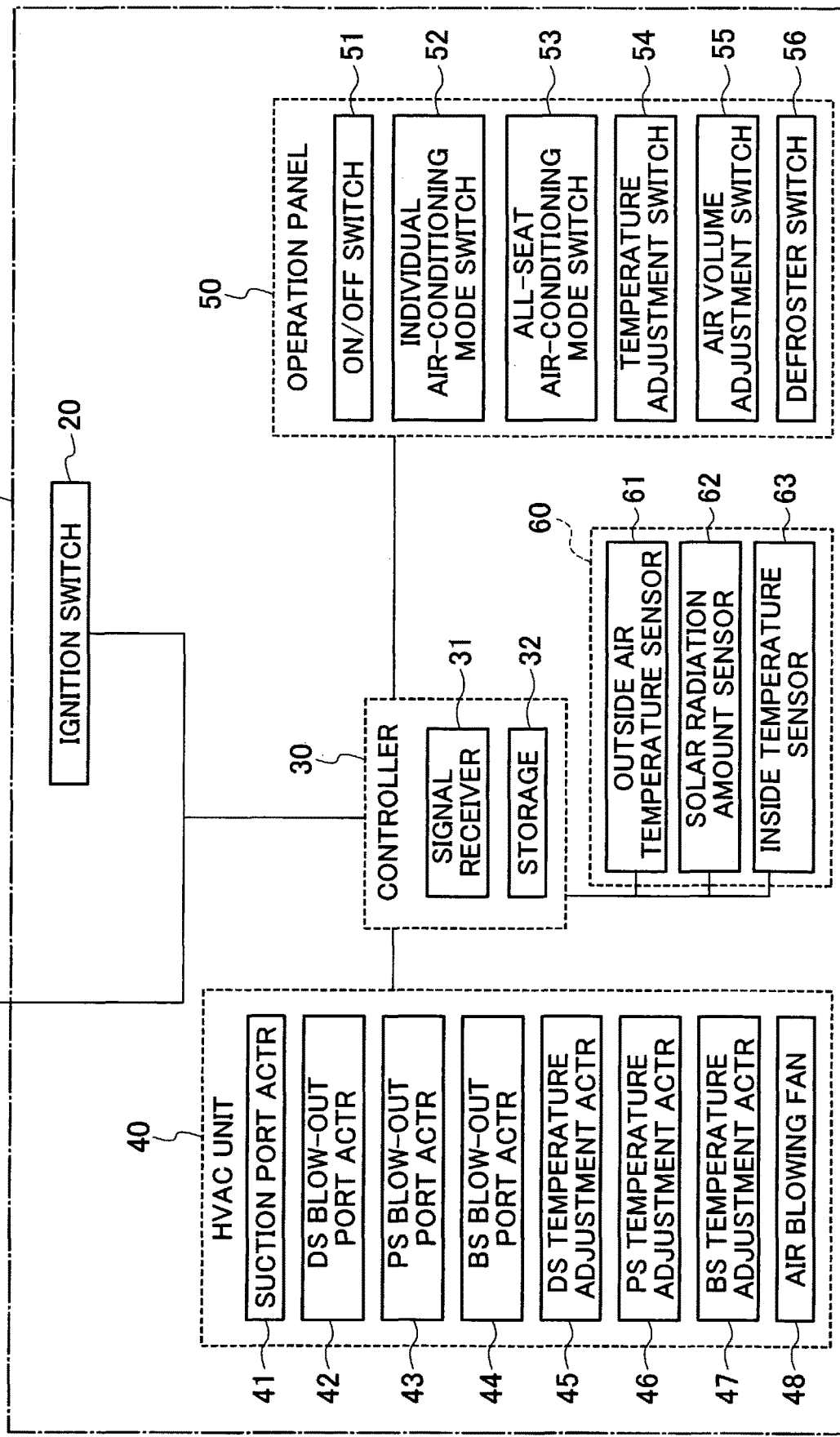

VEHICLE AIR-CONDITIONING METHOD AND VEHICLE AIR-CONDITIONING DEVICE

TECHNICAL FIELD

The present invention relates to a vehicle air-conditioning method and a vehicle air-conditioning device.

BACKGROUND ART

An invention of a vehicle air-conditioning device which performs air-conditioning control for each of seats has been conventionally known (Patent Literature 1). The invention according to Patent Literature 1 achieves energy saving by performing air-conditioning individually for a driving seat and a passenger seat.

CITATION LIST

Patent Literature

Patent Literature 1: Japanese Patent Application Publication No. 2013-224151

SUMMARY OF INVENTION

Technical Problem

In some air-conditioning devices, when an occupant turns on an ignition switch provided in a vehicle cabin, a previous air-conditioning mode is maintained. Specifically, when the occupant turns off the ignition switch with a switch of an individual air-conditioning mode set to on and then turns on the ignition switch on next time, the air-conditioning control is performed in the individual air-conditioning mode. Accordingly, when the occupant turns on an ignition of a vehicle by remote control to heat the inside of the vehicle cabin before getting into the vehicle, an air-conditioning amount is insufficient due to the individual air-conditioning mode and the inside of the entire vehicle cabin cannot be air-conditioned and heated in some cases.

The present invention has been made in view of the aforementioned problem and an object thereof is to provide a vehicle air-conditioning method and a vehicle air-conditioning device which can perform air-conditioning control of an inside of an entire vehicle cabin when an occupant turns on an ignition of a vehicle by remote control.

Solution to Problem

A vehicle air-conditioning method according to one aspect of the present invention uses an air-conditioning device having an all-seat air-conditioning mode in which air-conditioned air is blown out to occupants of all of seats in a vehicle cabin and an individual air-conditioning mode in which the air-conditioned air is blown out to some of the occupants of all of the seats. The vehicle air-conditioning method includes, when a vehicle is activated by a remote starter device configured to remotely activate the vehicle, controlling the air-conditioning device by switching an air-conditioning mode to the all-seat air-conditioning mode even when the air-conditioning mode selected at previous turning-off of an ignition device is the individual air-conditioning mode.

Advantageous Effects of Invention

According to the present invention, it is possible to perform air-conditioning control of an inside of an entire vehicle cabin when an occupant turns on an ignition of a vehicle by remote control.

BRIEF DESCRIPTION OF DRAWINGS

FIG. 1 is a configuration diagram of a vehicle air-conditioning device according to a first embodiment of the present invention.

DESCRIPTION OF EMBODIMENTS

Figure 2A:
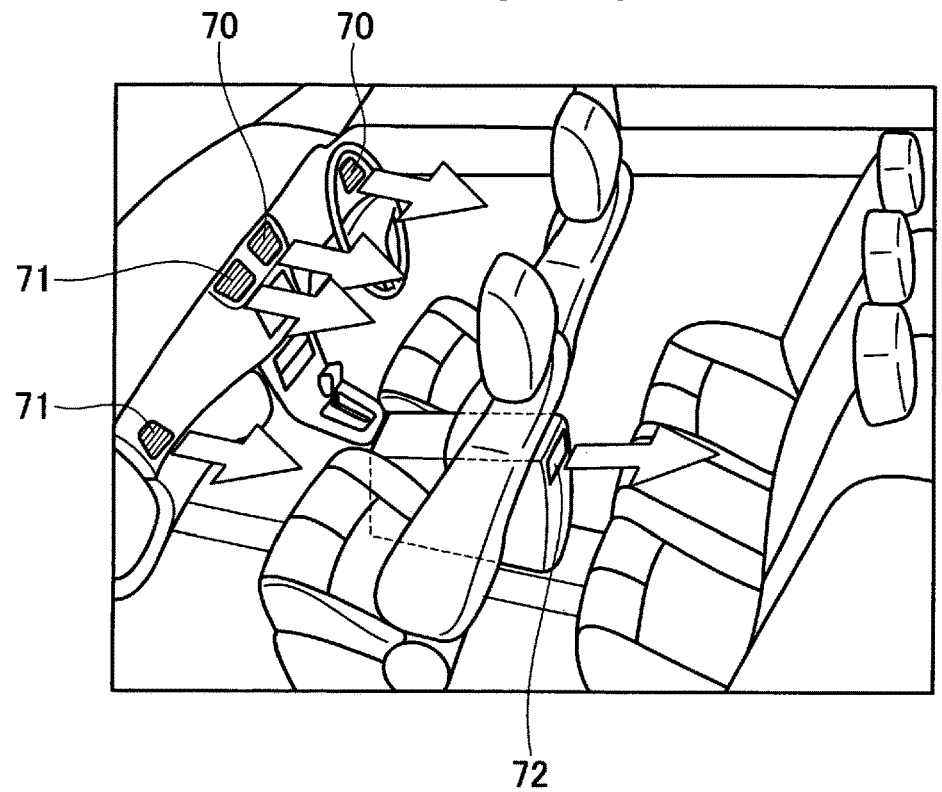
FIG. 2A is a view explaining an all-seat air-conditioning mode of the vehicle air-conditioning device according to the first embodiment of the present invention.

An embodiment of the present invention is described below with reference to the drawings. In the illustration of the drawings, the same parts are denoted by the same reference numerals and description thereof is omitted.

First Embodiment (Configuration of Vehicle Air-Conditioning Device)

A configuration of a vehicle air-conditioning device 100 according to the embodiment is described with reference to FIGS. 1 and 2. As illustrated in FIG. 1, the vehicle air-conditioning device 100 includes an ignition switch 20, a controller 30, an HVAC unit 40, an operation panel 50, and a sensor group 60.

The ignition switch 20 (ignition device) is provided near a driving seat in a vehicle cabin. A vehicle is started when an occupant of the vehicle turns on the ignition switch 20. Moreover, the vehicle is turned off when the occupant turns off the ignition switch 20. Note that the ignition switch 20 is generally a switch for igniting an internal combustion engine. However, in an electric car, since there is no ignition of the internal combustion engine, a switch for turning on and off an electric motor is provided instead of the ignition switch 20. In the first embodiment, the ignition switch 20 is assumed to include the switch for igniting the internal combustion engine and the switch for turning on and off the electric motor.

The controller 30 is a device which receives various signals and controls the HVAC unit 40 based on the received signals. The controller 30 is a general-purpose micro-computer including a CPU (Central Processing Unit), a memory, and an input-output unit. A computer program for controlling the HVAC unit 40 is installed in the micro-computer. The micro-computer functions as multiple information processing circuits included in the vehicle air-conditioning device 100 by executing the computer program. Note that, although an example in which the multiple information processing circuits included in the vehicle air-conditioning device 100 are implemented by software is described in this embodiment, the information processing circuits may be achieved by preparing dedicated hardware for executing various information processes to be described later as a matter of course. Moreover, the multiple information processing circuits may be achieved by individual pieces of hardware. The controller 30 includes a signal receiver 31 and a storage 32 as the multiple information processing circuits.

The HVAC unit 40 (HVAC: Heating Ventilation and Air-conditioning) is an air-conditioning device which blows out temperature-adjusted air into the vehicle cabin. The HVAC unit 40 drives a suction port actuator 41 to introduce air in the vehicle cabin and introduce outside air which is air outside the vehicle cabin. The HVAC unit 40 controls the actuators 42 to 47 based on a signal received from the controller 30.

The HVAC unit 40 forms a cooling system and a heater system. Although illustration is omitted, the HVAC unit 40 includes, for example, a compressor, a condenser, an indoor heat exchanger, an expansion valve, and the like and functions as the cooling system. When pressurized and liquefied coolant is discharged from the expansion valve to the indoor heat exchanger, the coolant absorbs heat by evaporating. The coolant thereby exchanges heat with air flowing through the indoor heat exchanger and cools the air. The coolant having completed heat exchange in the indoor heat exchanger is compressed by the compressor. The coolant which is compressed by the compressor and whose temperature has become high is cooled by means of heat dispassion and is liquefied by the condenser to be supplied to the indoor heat exchanger again.

Moreover, although illustration is omitted, the HVAC unit 40 includes, for example a heater core, a PTC heater (PTC: Positive Temperature Coefficient), a pump, and the like and functions as the heater system. Air having passed the indoor heat exchanger is supplied to the heater core and is heated. The pump circulates warm water between the heater core and the PTC heater.

Figure 2B:
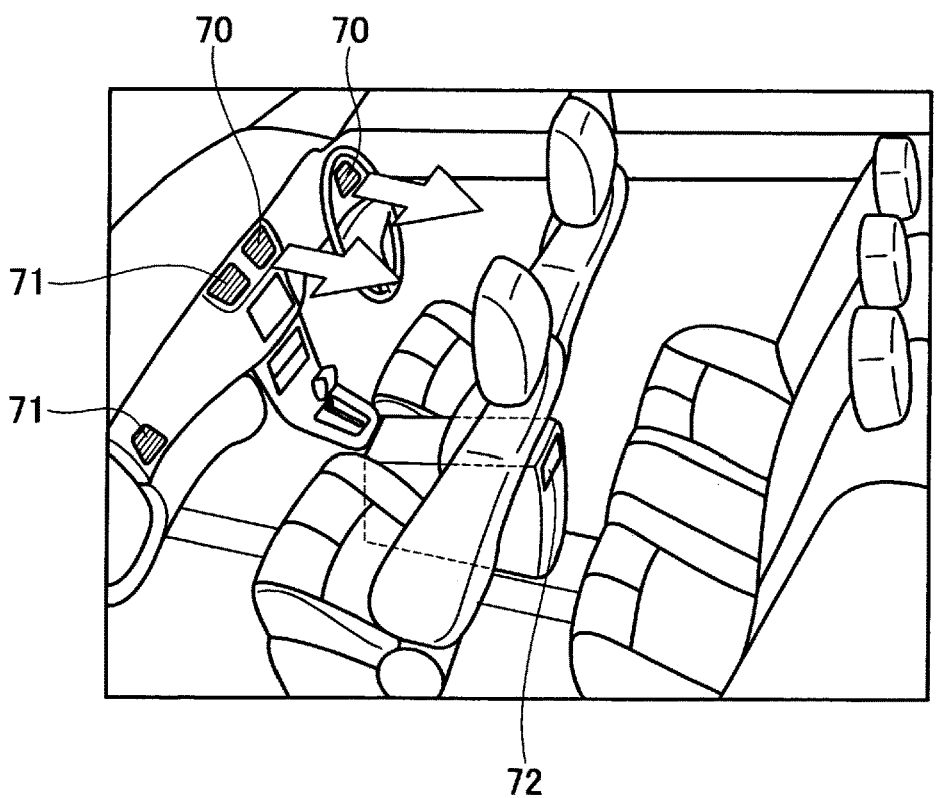
FIG. 2B is a view explaining an individual air-conditioning mode of the vehicle air-conditioning device according to the first embodiment of the present invention.

The HVAC unit 40 has an all-seat air-conditioning mode and an individual air-conditioning mode as air-conditioning modes. As illustrated in FIG. 2A, the all-seat air-conditioning mode is a mode in which air-conditioned air is blown out from a driving seat blow-out port 70, a passenger seat blow-out port 71, and a back seat blow-out port 72. Meanwhile, as illustrated in FIG. 2B, the individual air-conditioning mode is a mode in which the air-conditioned air is blown out only from the driving seat blow-out port 70. In other words, the all-seat air-conditioning mode is a mode in which the temperature inside the entire vehicle cabin is uniformly adjusted. The individual air-conditioning mode is a mode in which only the temperature of an area around the driving seat is individually adjusted. Specifically, the all-seat air-conditioning mode is a mode in which the air-conditioned air is blown out to occupants of all seats in the vehicle cabin. The individual air-conditioning mode is a mode in which the air-conditioned air is blown out to some of the occupants of all seats in the vehicle cabin. Although the individual air-conditioning mode is described in the first embodiment as a mode in which only the temperature of the area around the driving seat is individually adjusted, the individual air-conditioning mode is not limited to such a mode. For example, the individual air-conditioning mode may be a mode in which only the temperature of an area around the passenger seat is individually adjusted or a mode in which only the temperature of an area around the back seat is individually adjusted. Moreover, the individual air-conditioning mode may be a mode in which the temperature of an area around the driving seat and the passenger seat is individually adjusted, a mode in which the temperature of an area around the driving seat and the back seat is individually adjusted, or a mode in which the temperature of an area around the passenger seat and the back seat is individually adjusted.

The HVAC unit 40 controls a DS blow-out port actuator 42 (DS: Driving Seat) and blows out the air-conditioned air from the driving seat blow-out port 70 by using an air blowing fan 48. Similarly, the HVAC unit 40 controls a PS blow-out port actuator 43 (PS: Passenger Seat) and blows out the air-conditioned air from the passenger seat blow-out port 71 by using the air blowing fan 48. Similarly, the HVAC unit 40 controls a BS blow-out port actuator 44 (BS: Back Seat) and blows out the air-conditioned air from the back seat blow-out port 72 by using the air blowing fan 48. Moreover, the HVAC unit 40 controls a DS temperature adjustment actuator 45, a PS temperature adjustment actuator 46, and a BS temperature adjustment actuator 47 to adjust the temperature of the air-conditioned air to be blown out from the blow-out ports.

The operation panel 50 (selection device) is a device provided in the vehicle cabin and receives selection for the HVAC unit 40 made by the occupant. The operation panel 50 is provided with an on/off switch 51, an individual air-conditioning mode switch 52, an all-seat air-conditioning mode switch 53, a temperature adjustment switch 54, an air volume adjustment switch 55, and a defroster switch 56. Note that the switches provided in the operation panel 50 are not limited to these switches. Moreover, lamps indicating operation states of the respective switches are provided in the operation panel 50. The lamps are, for example, LEDs (Light Emitting Diodes). The operation panel 50 outputs signals relating to the states of the switches set by the occupant to the controller 30.

The on/off switch 51 is a switch for switching the HVAC unit 40 on and off. When the occupant turns on the on/off switch 51, the HVAC unit 40 operates. When the occupant turns off the on/off switch 51, the HVAC unit 40 stops.

The individual air-conditioning mode switch 52 is a switch for switching the air-conditioning mode of the HVAC unit 40 from the all-seat air-conditioning mode to the individual air-conditioning mode. When the occupant presses the individual air-conditioning mode switch 52, the air-conditioning mode is switched from the all-seat air-conditioning mode to the individual air-conditioning mode.

The all-seat air-conditioning mode switch 53 is a switch for switching the air-conditioning mode of the HVAC unit 40 from the individual air-conditioning mode to the all-seat air-conditioning mode. When the occupant presses the all-seat air-conditioning mode switch 53, the air-conditioning mode is switched from individual air-conditioning mode to the all-seat air-conditioning mode.

The temperature adjustment switch 54 is a switch for adjusting the temperature. The HVAC unit 40 controls the temperature adjustment actuators 45 to 47 such that temperature set by the occupant is achieved.

The air volume adjustment switch 55 is a switch for adjusting an air volume. The HVAC unit 40 controls the air blowing fan 48 to blow air at an air volume set by the occupant.

The defroster switch 56 is a switch for switching a defroster on and off. When the occupant turns on the defroster switch 56, the HVAC unit 40 blows the air-conditioned air toward an inner surface of a windshield.

These switches may each be a push switch or a dial switch. Moreover, a changing switch may be provided instead of the individual air-conditioning mode switch 52 and the all-seat air-conditioning mode switch 53. The air-conditioning mode is thereby switched between the individual air-conditioning mode and the all-seat air-conditioning mode every time the occupant pushes the changing switch.

The sensor group 60 includes an outside air temperature sensor 61 configured to detect the temperature outside the vehicle cabin, an inside temperature sensor 63 configured to detect the temperature inside the vehicle cabin, and a solar radiation amount sensor 62 configured to detect the solar radiation amount. This sensor group 60 outputs detected information to the controller 30.

The controller 30 calculates a target blow-out temperature based on the temperature detected by the outside air temperature sensor 61, the temperature detected by the inside temperature sensor 63, and the solar radiation amount detected by the solar radiation amount sensor 62. The controller 30 outputs the calculated target blow-out temperature to the HVAC unit 40. The HVAC unit 40 controls the temperature adjustment actuators 45 to 47 such that the temperature of the air-conditioned air blown out from the blow-out ports 70 to 72 is the target blow-out temperature received from the controller 30.

A remote starter device 10 is a device for remotely activating the ignition of the vehicle. The remote starter device 10 is, for example, a remote key, a smartphone, or the like. When the occupant causes the remote starter device 10 to operate, a starter signal is transmitted to the vehicle.

The signal receiver 31 receives the starter signal transmitted from the remote starter device 10. When the signal receiver 31 receives the starter signal, the controller 30 turns on the ignition of the vehicle and activates the HVAC unit 40.

The storage 32 stores the air-conditioning mode of the HVAC unit 40 at the turning-off of the ignition switch 20 by the occupant. When the air-conditioning mode at the turning-off of the ignition switch 20 by the occupant is the all-seat air-conditioning mode, the storage 32 stores that the air-conditioning mode is the all-seat air-conditioning mode. Meanwhile, when the air-conditioning mode at the turning-off of the ignition switch 20 by the occupant is the individual air-conditioning mode, the storage 32 stores that the air-conditioning mode is the individual air-conditioning mode. When the occupant turns on the ignition switch 20 provided in the vehicle cabin next time, the controller 30 controls the HVAC unit 40 such that the air-conditioning mode is set to the air-conditioning mode stored in the storage 32. The occupant thus does not have to set the air-conditioning mode every time the occupant turns on the ignition switch 20. Inconvenience felt by the occupant can be thereby reduced. Note that the controller 30 may control the HVAC unit 40 such that, when the occupant turns on the ignition switch 20, the air-conditioning mode is set to the individual air-conditioning mode irrespective of the air-conditioning mode stored in the storage 32.

In the first embodiment, when the controller 30 receives the starter signal from the remote starter device 10, the controller 30 controls the HVAC unit 40 such that the air-conditioning mode is set to the all-seat air-conditioning mode irrespective of the air-conditioning mode stored in the storage 32. Specifically, when the controller 30 receives the starter signal from the remote starter device 10, the controller 30 controls the HVAC unit 40 such that the air-conditioning mode is set to the all-seat air-conditioning mode even when the air-conditioning mode stored in the storage 32 is the individual air-conditioning mode. In a cold season, there is a demand for heating the inside of the vehicle cabin before the occupant gets into the vehicle. In the first embodiment, when the occupant turns on the ignition of the vehicle by using the remote starter device 10, the controller 30 controls the HVAC unit 40 such that the air-conditioning mode is set to the all-seat air-conditioning mode irrespective of the air-conditioning mode stored in the storage 32. The HVAC unit 40 thereby operates in the all-seat air-conditioning mode and can uniformly heat the inside of the entire vehicle cabin before the occupant gets into the vehicle and the occupant can thus feel comfortable when getting into the vehicle. Moreover, in a hot season, there is a demand for cooling the inside of the vehicle cabin before the occupant gets into the vehicle. When the occupant turns on the ignition of the vehicle by using the remote starter device 10, the controller 30 controls the HVAC unit 40 such that the air-conditioning mode is set to in the all-seat air-conditioning mode irrespective of the air-conditioning mode stored in the storage 32. The HVAC unit 40 thereby operates in the all-seat air-conditioning mode and can uniformly cool the inside of the entire vehicle cabin before the occupant gets into the vehicle and the occupant can thus feel comfortable when getting into the vehicle.

Figure 3:
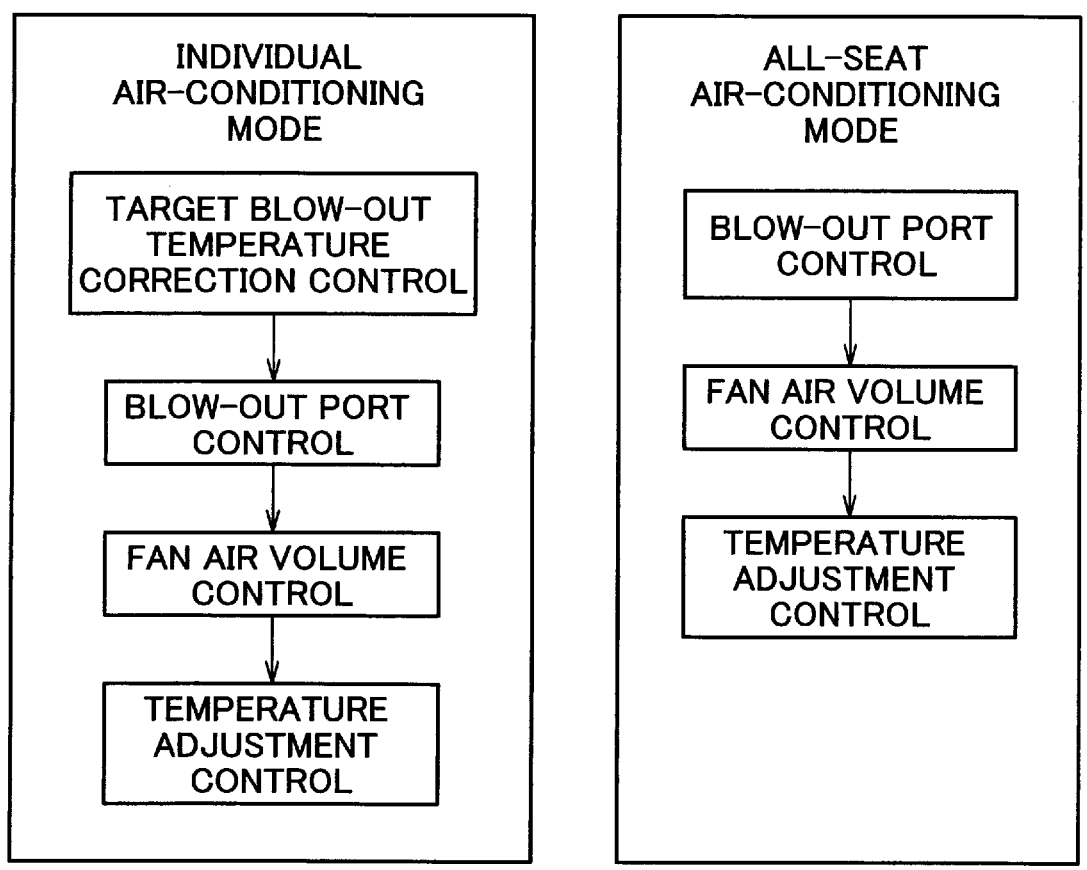
FIG. 3 is a view explaining control methods in the individual air-conditioning mode and the all-seat air-conditioning mode according to the first embodiment of the present invention.

Next, the individual air-conditioning mode and the all-seat air-conditioning mode are described with reference to FIG. 3. As illustrated in FIG. 3, when the occupant selects the individual air-conditioning mode, the controller 30 corrects the target blow-out temperature based on the temperature detected by the outside air temperature sensor 61, the temperature detected by the inside temperature sensor 63, and the solar radiation amount detected by the solar radiation amount sensor 62. The controller 30 outputs the corrected target blow-out temperature to the HVAC unit 40.

The HVAC unit 40 controls the blow-out port actuators 42 to 44 such that the air-conditioned air is blown out only from the driving seat blow-out port 70. Next, the HVAC unit 40 controls the air blowing fan 48 to blow out air at the air volume set by the occupant. Then, the HVAC unit 40 controls the DS temperature adjustment actuator 45 such that the temperature of the air-conditioned air blown out from the driving seat blow-out port 70 is the target blow-out temperature received from the controller 30.

Meanwhile, as illustrated in FIG. 3, when the occupant selects the all-seat air-conditioning mode, the HVAC unit 40 controls the blow-out port actuators 42 to 44 such that the air-conditioned air is blown out from the blow-out ports 70 to 72. Next, the HVAC unit 40 controls the air blowing fan 48 to blow out air at the air volume set by the occupant. Then, the HVAC unit 40 controls the temperature adjustment actuators 45 to 47 such that the temperature of the air-conditioned air blown out from the blow-out ports 70 to 72 is the target blow-out temperature received from the controller 30.

(Example of Operation of Vehicle Air-Conditioning Device)

Figure 4:
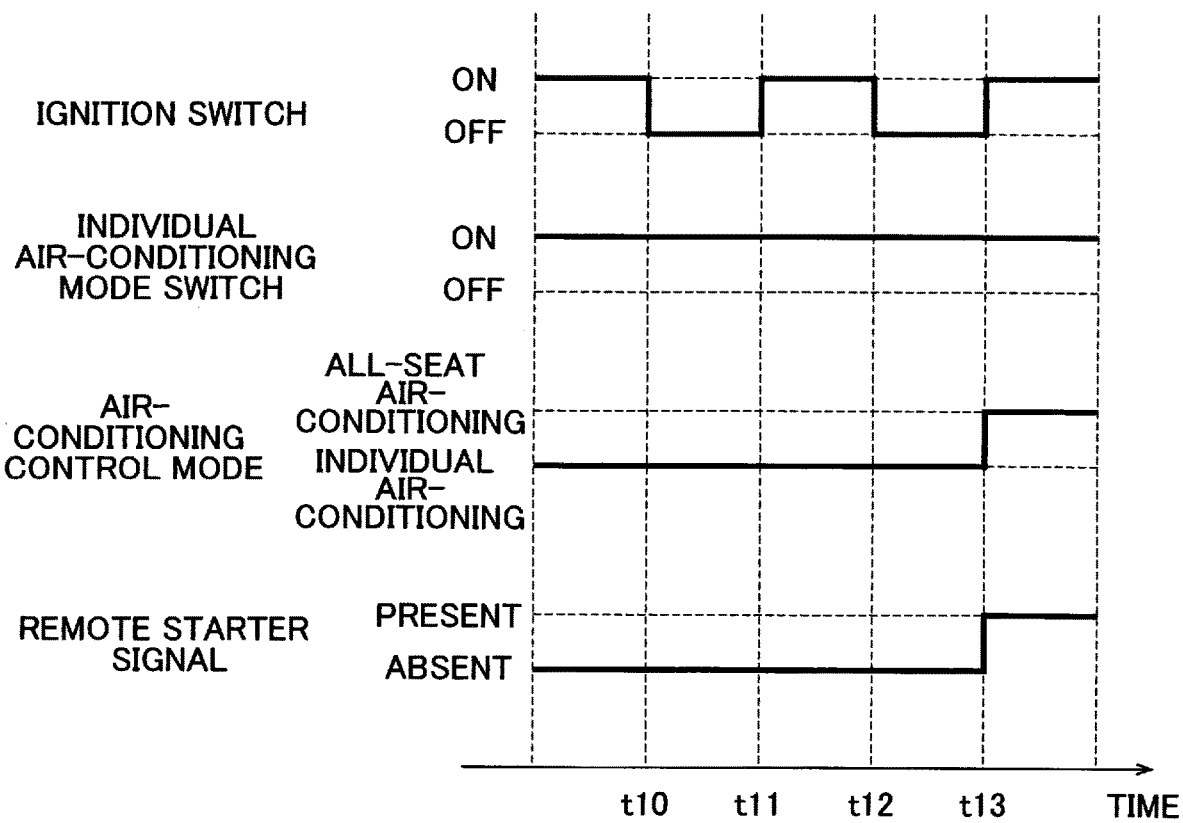
FIG. 4 is a time chart explaining an example of an operation of the vehicle air-conditioning device according to the first embodiment of the present invention.

Next, an example of an operation of the vehicle air-conditioning device 100 is described with reference to the time chart of FIG. 4.

Assume that the occupant turns off the ignition switch 20 at a time point t10. Since the individual air-conditioning mode switch 52 is on at the time point t10, the air-conditioning mode of the HVAC unit 40 is the individual air-conditioning mode. Next, when the occupant turns on the ignition switch 20 at a time point t11, the controller 30 controls the HVAC unit 40 such that the air-conditioning mode is set to the air-conditioning mode stored in the storage 32. Since the air-conditioning mode at the previous turning-off of the ignition switch 20 by the occupant (time point t10) is the individual air-conditioning mode, the individual air-conditioning mode is stored in the storage 32. Accordingly, at the time point t11, the controller 30 controls the HVAC unit 40 such that the air-conditioning mode is set to the individual air-conditioning mode. Then, at a time point t12, the occupant turns off the ignition switch 20. Next, at a time point t13, when the occupant remotely turns on the ignition of the vehicle by using the remote starter device 10, the controller 30 controls the HVAC unit 40 such that the air-conditioning mode is set to the all-seat air-conditioning mode, though the air-conditioning mode stored in the storage 32 is the individual air-conditioning mode. Specifically, when the occupant remotely turns on the ignition of the vehicle by using the remote starter device 10, the HVAC unit 40 performs the air-conditioning control by switching to the all-seat air-conditioning mode to make the temperature of the inside of the entire vehicle cabin uniform. The inside of the vehicle cabin is thereby made comfortable when the occupant gets into the vehicle and the occupant can feel comfortable when getting into the vehicle.

In the first embodiment, it is described that, when the occupant remotely turns on the ignition of the vehicle by using the remote starter device 10, the HVAC unit 40 performs the air-conditioning control by switching to the all-seat air-conditioning mode even when the air-conditioning mode stored in the storage 32 is the individual air-conditioning mode. Meanwhile, when the occupant turns on the ignition switch 20, the HVAC unit 40 does not have to perform the air-conditioning control by switching to the all-seat air-conditioning mode in the case where the air-conditioning mode stored in the storage 32 is the individual air-conditioning mode. The reason for this is that, if the HVAC unit 40 performs the air-conditioning control by switching to the all-seat air-conditioning mode upon turning-on of the ignition switch 20 by the occupant, the HVAC unit 40 wastes energy and the fuel economy decreases.

When the driver is the only occupant, the driver can feel comfortable in either of the all-seat air-conditioning mode or the individual air-conditioning mode. However, it is difficult for the driver to know from which one of the blow-out ports the air-conditioned air is blown out and the driver sometimes cannot tell whether the air-conditioning mode is the all-seat air-conditioning mode or the individual air-conditioning mode. Specifically, assume a case where, when the occupant (driver only) turns on the ignition switch 20, the HVAC unit 40 performs the air-conditioning control by switching to the all-seat air-conditioning mode, though the air-conditioning mode stored in the storage 32 is the individual air-conditioning mode. In this case, the driver feels comfortable and thus continues driving as it is and this may lead to the decrease in fuel economy. Accordingly, when the occupant (driver only) turns on the ignition switch 20, the HVAC unit 40 does not have to perform the air-conditioning control by switching to the all-seat air-conditioning mode. When there are multiple occupants in the vehicle and the HVAC unit 40 is activated in the individual air-conditioning mode, any of the occupants can easily switch the air-conditioning mode to the all-seat air-conditioning mode. Note that, when the air-conditioning mode at the previous turning-off of the ignition switch 20 by the occupant is the all-seat air-conditioning mode, in the next turning-on of the ignition switch 20 by the occupant, the HVAC unit 40 may perform the air-conditioning control in the all-seat air-conditioning mode.

Figure 5:
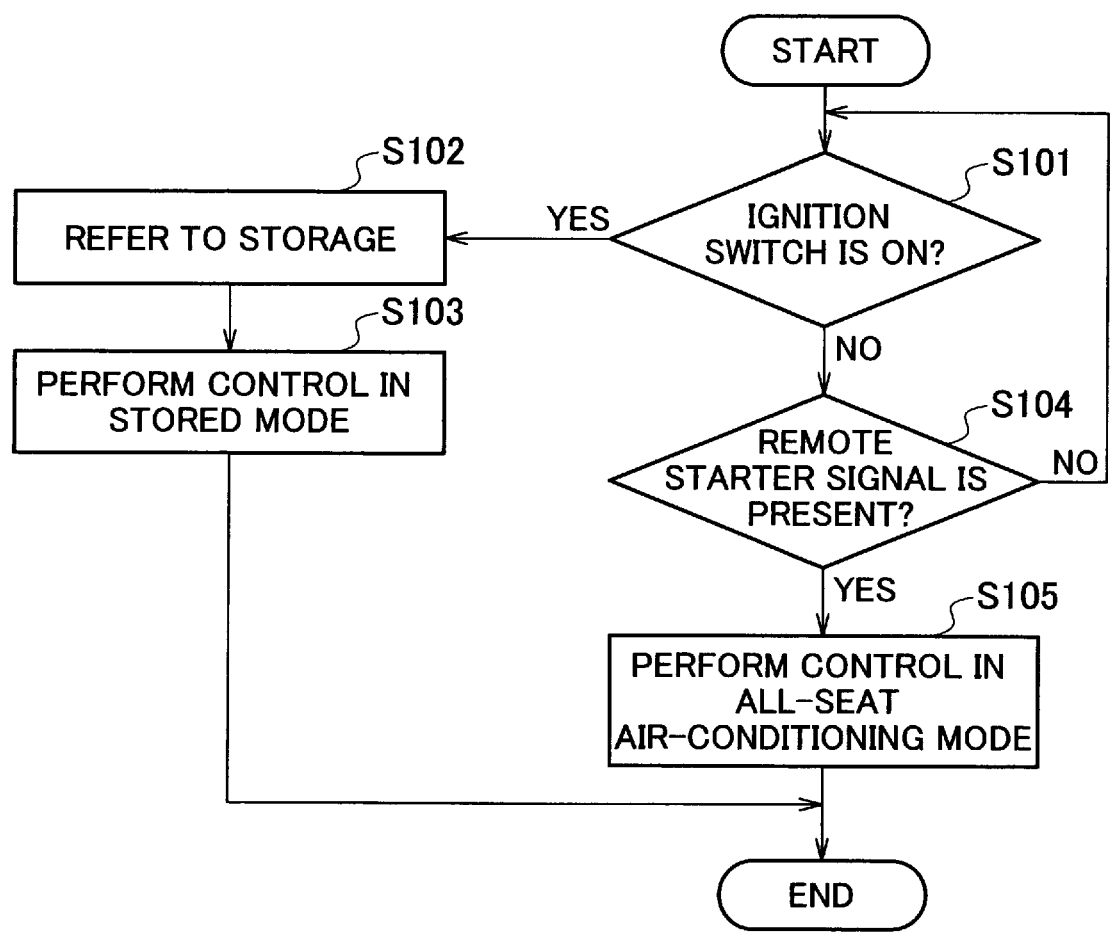
FIG. 5 is a flowchart explaining the example of the operation of the vehicle air-conditioning device according to the first embodiment of the present invention.

Next, an example of an operation of the vehicle air-conditioning device 100 is described with reference to the flowchart illustrated in FIG. 5. When the occupant turns on the ignition switch 20 in step S101, the processing proceeds to step S102 and the controller 30 refers to the storage 32. The reason why the controller 30 refers to the storage 32 is to control the HVAC unit 40 such that the air-conditioning mode is set to the air-conditioning mode stored in the storage 32. The occupant thus does not have to set the air-conditioning mode every time he/she turns on the ignition switch 20 of the vehicle. The controller 30 refers to the storage 32 and determines whether the air-conditioning mode at the previous turning-off of the ignition switch 20 by the occupant is the all-seat air-conditioning mode or the individual air-conditioning mode. Next, the processing proceeds to step S103 and the controller 30 controls the HVAC unit 40 such that the air-conditioning mode is set to the air-conditioning mode stored in the storage 32.

Meanwhile, when the occupant does not turn on the ignition switch 20 in step S101, the processing proceeds to step S104 and the controller 30 determines whether the controller 30 receives the starter signal from the remote starter device 10. When the controller 30 receives the starter signal from the remote starter device 10, the processing proceeds to step S105 and the controller 30 controls the HVAC unit 40 such that the air-conditioning mode is set to the all-seat air-conditioning mode irrespective of the air-conditioning mode stored in the storage 32. When the occupant remotely turns on the ignition of the vehicle by using the remote starter device 10, the HVAC unit 40 thus performs the air-conditioning control by switching to the all-seat air-conditioning mode to make the temperature of the inside of the entire vehicle cabin uniform. The inside of the vehicle cabin is thus comfortable when the occupant gets into the vehicle and the occupant can feel comfortable when getting into the vehicle. Meanwhile, when the controller 30 does not receive the starter signal from the remote starter device 10 in step S104, the processing returns to step S101.

(Operations and Effects)

As described above, the following operations and effects can be obtained in the vehicle air-conditioning device 100 according to the first embodiment.

The vehicle air-conditioning device 100 according to the first embodiment includes the HVAC unit 40. The HVAC unit 40 has the all-seat air-conditioning mode in which the air-conditioned air is blown out to occupants of all seats in the vehicle cabin and the individual air-conditioning mode in which the air-conditioned air is blown out to some of the occupants of all seats in the vehicle cabin. When the occupant remotely turns on the ignition of the vehicle by using the remote starter device 10, the controller 30 controls the HVAC unit 40 such that the air-conditioning mode is set to the all-seat air-conditioning mode irrespective of the air-conditioning mode stored in the storage 32. The HVAC unit 40 can thereby perform the air-conditioning control of the inside of the entire vehicle cabin to make the temperature inside the entire vehicle cabin uniform. In a cold season there is a demand for heating the inside of the vehicle cabin before the occupant gets into the vehicle. The HVAC unit 40 can thus uniformly heat the inside of the entire vehicle cabin before the occupant gets into vehicle and thereby make the occupant feel comfortable when the occupant gets into the vehicle. Moreover, in a hot season, there is a demand for cooling the inside of the vehicle cabin before the occupant gets into the vehicle. The HVAC unit 40 can thus uniformly cool the inside of the entire vehicle cabin before the occupant gets into vehicle and thereby make the occupant feel comfortable when the occupant gets into the vehicle.

Moreover, when the occupant turns on the ignition switch 20 provided in the vehicle cabin, the controller 30 controls the HVAC unit 40 in the air-conditioning mode selected at the previous turning-off of the ignition switch 20 by the occupant. The occupant thereby does not have to set the air-conditioning mode every time he/she turns on the ignition switch 20. The inconvenience felt by the occupant is thereby reduced.

Figure 6:
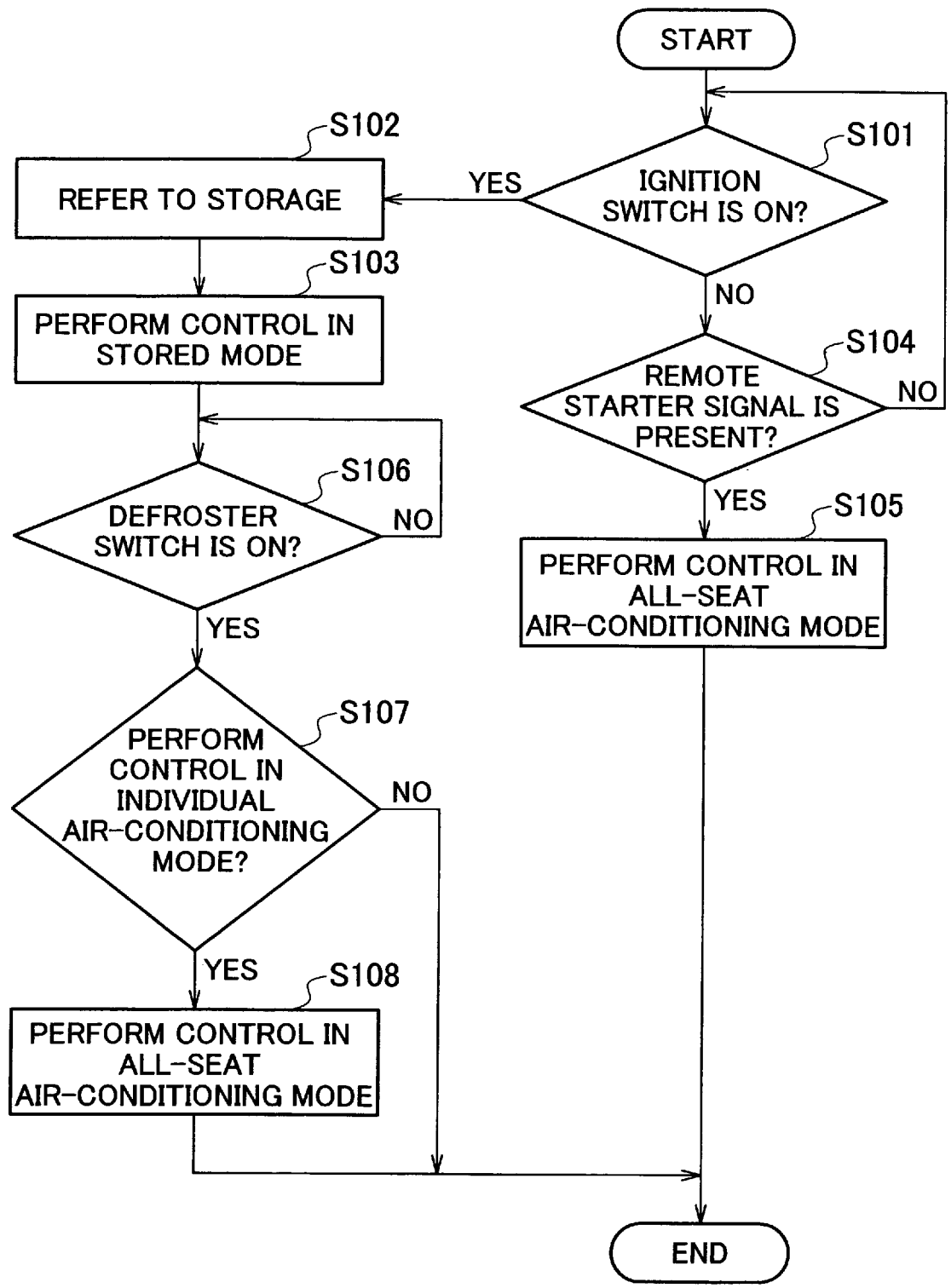
FIG. 6 is a flowchart explaining another example of the operation of the vehicle air-conditioning device according to the first embodiment of the present invention.

Note that the vehicle air-conditioning device 100 may consider the defroster. For example, when the occupant turns on the defroster switch 56, the HVAC unit 40 may perform the air-conditioning control by switching to the all-seat air-conditioning mode irrespective of the current air-conditioning mode. An example of an operation taking into consideration of the defroster is described with reference to the flowchart illustrated in FIG. 6. Note that, since operations of steps S101 to S105 illustrated in FIG. 6 are the same as the operations of steps S101 to S105 illustrated in FIG. 5, detailed description thereof is omitted.

In step S106, when the occupant turns on the defroster switch 56, the processing proceeds to step S107. In step S107, when the air-conditioning mode is the individual air-conditioning mode, the processing proceeds to step S108. In step S108, the HVAC unit 40 performs the air-conditioning control by switching the air-conditioning mode from the individual air-conditioning mode to the all-seat air-conditioning mode and blows out the air-conditioned air toward the inner surface of the windshield. The HVAC unit 40 can thereby perform the air-conditioning control desired by the occupant.

Second Embodiment (Configuration of Vehicle Air-Conditioning Device)

Figure 7:
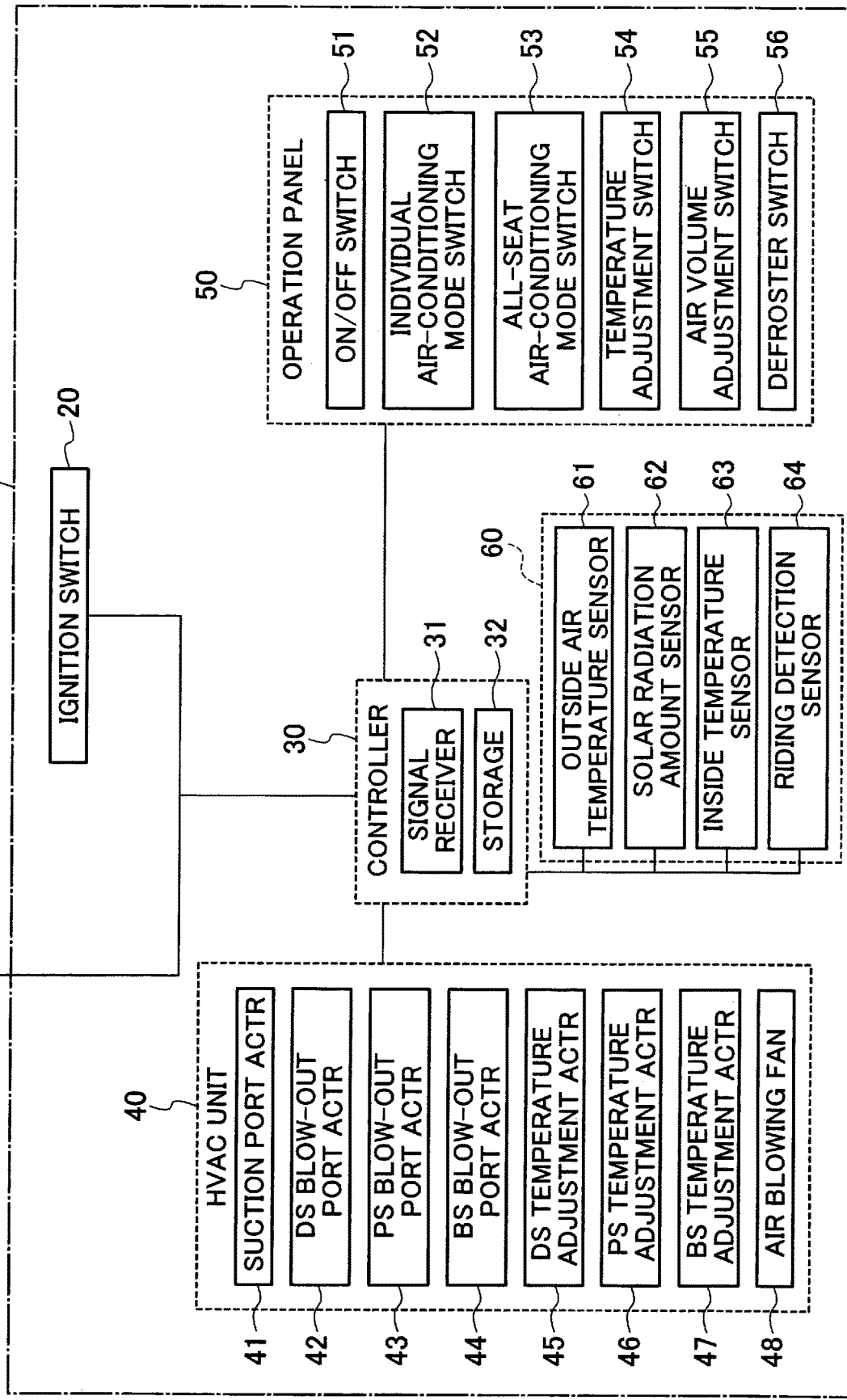
FIG. 7 is a configuration diagram of a vehicle air-conditioning device according to a second embodiment of the present invention.

Next, a second embodiment of the present invention is described with reference to FIG. 7. The second embodiment is different from the first embodiment in that a vehicle air-conditioning device 200 according to the second embodiment further includes a riding detection sensor 64. The same portions as those in the first embodiment are denoted by the same reference numerals and detailed description thereof is omitted. Differences are mainly described below.

The riding detection sensor 64 is a sensor configured to detect the occupant getting into the vehicle. For example, the riding detection sensor 64 is a door open-close detection sensor. The door open-close detection sensor is a sensor which detects an open-closed state of each door of the vehicle. The riding detection sensor 64 outputs a signal to the controller 30 when each door of the vehicle switches from the closed state to the open state. This signal is a signal indicating that the occupant gets into the vehicle and is simply referred to as riding signal hereafter.

(Example of Operation of Vehicle Air-Conditioning Device)

Figure 8:
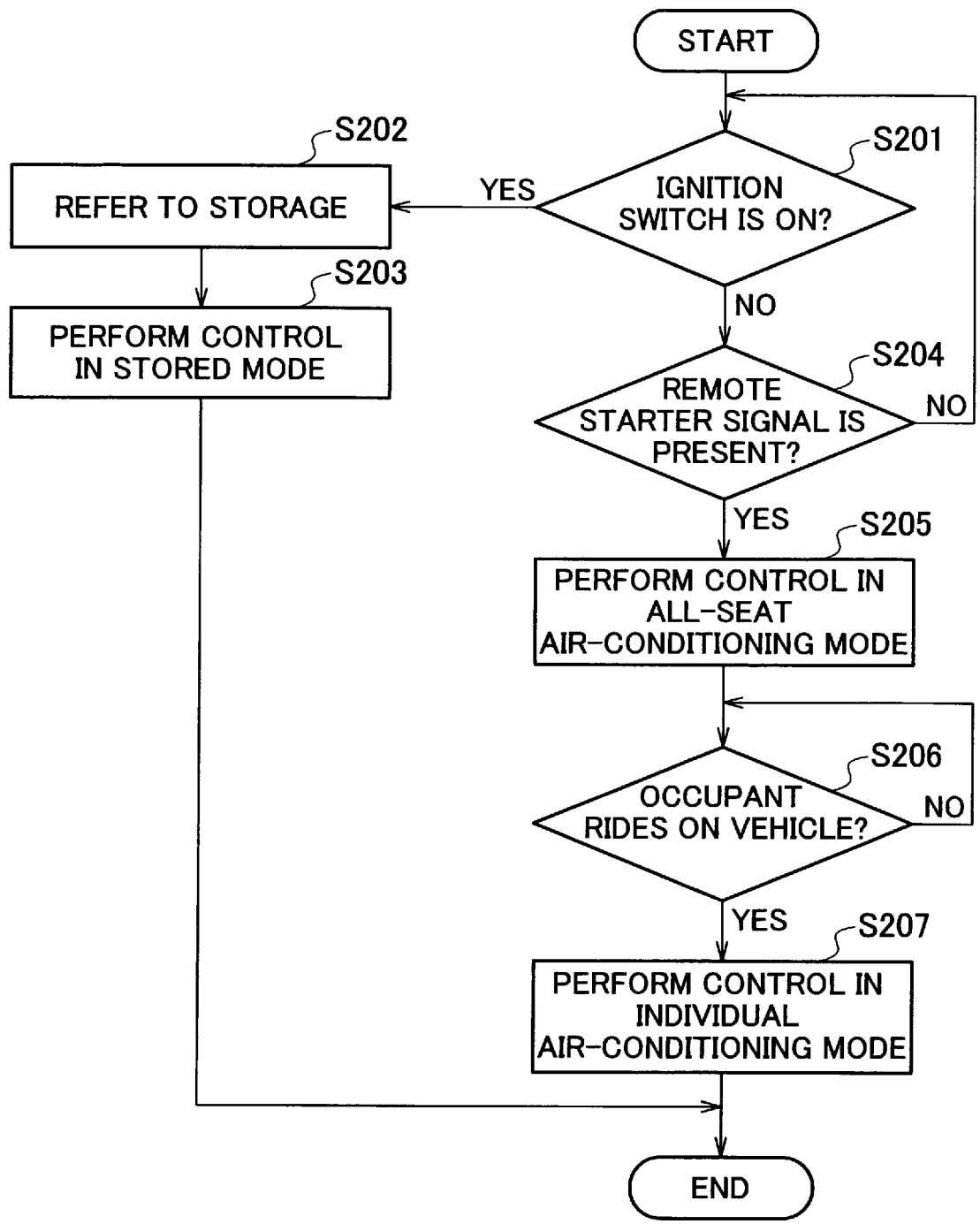
FIG. 8 is a flowchart explaining an example of an operation of the vehicle air-conditioning device according to the second embodiment of the present invention.

When the controller 30 receives the starter signal from the remote starter device 10 and then receives the riding signal from the riding detection sensor 64, the controller 30 controls the HVAC unit 40 such that the air-conditioning mode is set to the individual air-conditioning mode. An example of this operation is described with reference to the flowchart illustrated in FIG. 8. Note that, since operations of steps S201 to S205 illustrated in FIG. 8 are the same as the operations of steps S101 to S105 illustrated in FIG. 5, detailed description thereof is omitted and only the differences are described.

When the controller 30 receives the starter signal from the remote starter device 10 and then receives the riding signal from the riding detection sensor 64 in step S206, the processing proceeds to step S207. In step S207, the controller 30 switches the air-conditioning mode from the all-seat air-conditioning mode to the individual air-conditioning mode.

(Operations and Effects)

As described above, the following operation and effects can be obtained in the vehicle air-conditioning device 200 according to the second embodiment.

When the controller 30 receives the starter signal from the remote starter device 10, the controller 30 controls the HVAC unit 40 such that the air-conditioning mode is set to the all-seat air-conditioning mode irrespective of the air-conditioning mode stored in the storage 32. Thereafter, when the controller 30 receives the riding signal from the riding detection sensor 64, the controller 30 switches the air-conditioning mode from the all-seat air-conditioning mode to the individual air-conditioning mode.

When the occupant remotely turns on the ignition of the vehicle by using the remote starter device 10, the HVAC unit 40 performs the air-conditioning by switching to the all-seat air-conditioning mode to make the temperature of the entire vehicle cabin uniform. The inside of the vehicle cabin is thereby comfortable when the occupant gets into the vehicle and the occupant can feel comfortable when getting into the vehicle. Accordingly, the vehicle cabin remains comfortable even when the air-conditioning mode is switched from the all-seat air-conditioning mode to the individual air-conditioning mode after the occupant gets into the vehicle. Moreover, the controller 30 can contribute to energy saving by switching the air-conditioning mode from the all-seat air-conditioning mode to the individual air-conditioning mode.

Furthermore, the vehicle air-conditioning device 200 may control the HVAC unit 40 by using a seating sensor such that the air-conditioning mode is set to the individual air-conditioning mode for a seat taken by the occupant. The seating sensor is a sensor for detecting presence or absence of the occupant on each seat of the vehicle. The controller 30 may be configured such that, when the air-conditioning mode is switched from the all-seat air-conditioning mode to the individual air-conditioning mode, the controller 30 detects the seat taken by the occupant by using a signal received from the seating senor and controls the HVAC unit 40 such that the air-conditioning mode is set to the individual air-conditioning mode for the seat taken by the occupant. For example, when the controller 30 detects that the occupants are seating on the driving seat and the passenger seat, the controller 30 may control the HVAC unit 40 such that the air-conditioning mode is set to the individual air-conditioning mode in which the temperature around the driving seat and the passenger seat is individually adjusted. The HVAC unit 40 can thereby provide comfort to the occupant and also contribute to energy saving. Note that the controller 30 may use a seat belt sensor instead of the seating sensor or use both of the seating sensor and the seat belt sensor.

Note that, as in the first embodiment, the vehicle air-conditioning device 200 may consider the defroster also in the second embodiment.

Other Embodiments

Although the embodiments of the present invention are described as above, it should not be understood that the description and drawings forming part of this disclosure limit the present invention. From this disclosure, various alternative embodiments, examples, and operations techniques will be found by those skilled in the art.

For example, although the signal receiver 31 is described as one of the functions of the controller 30 in the embodiments, a signal receiving device configured to receive the signal from the remote starter device 10 may be provided separately from the controller 30.

Moreover, although the door open-close detection sensor is described as an example of the riding detection sensor 64 in the second embodiment, the riding detection sensor 64 is not limited to the door open-close detection sensor. For example, the riding detection sensor 64 may be a seating sensor or a seat belt sensor. Note that the riding detection sensor 64 is preferably the door open-close detection sensor from the viewpoint of energy saving. The reason for this is because the occupant getting into the vehicle can be detected more quickly by the door open-close detection than the seating detection or the seat belt fastening detection.

REFERENCE SIGNS LIST 100, 200 vehicle air-conditioning device
10 remote starter device
20 ignition switch
30 controller
31 signal receiver
40 HVAC unit
52 individual air-conditioning mode switch
53 all-seat air-conditioning mode switch
64 riding detection sensor

The invention claimed is:

1. A vehicle air-conditioning method using an air-conditioning device having an all-seat air-conditioning mode in which air-conditioned air is blown out to occupants of all of seats in a vehicle cabin and an individual air-conditioning mode in which the air-conditioned air is blown out to some of the occupants of all of the seats, comprising:

when a vehicle is activated by a remote starter device configured to remotely activate the vehicle, controlling the air-conditioning device by switching an air-conditioning mode to the all-seat air-conditioning mode when the air-conditioning mode selected at previous turning-off of an ignition device is the individual air-conditioning mode, and controlling the air-conditioning device by switching the all-seat air-conditioning mode to the individual air-conditioning mode after the air-conditioning device in the all-seat air-conditioning mode has made the vehicle cabin a desired temperature.

2. The vehicle air-conditioning method according to claim 1, comprising:

after detecting the occupant getting into the vehicle, detecting a seat taken by the occupant; and controlling the air-conditioning device by setting the air-conditioning mode to the individual air-conditioning mode for the seat taken by the occupant.

3. A vehicle air-conditioning device used in a vehicle, comprising:

an air-conditioning device having an all-seat air-conditioning mode in which air-conditioned air is blown out to occupants of all of seats in a vehicle cabin and an individual air-conditioning mode in which the air-conditioned air is blown out to some of the occupants of all of the seats;

a selection device used to select the all-seat air-conditioning mode and the individual air-conditioning mode; and a controller configured to control the air-conditioning device in an air-conditioning mode selected in the selection device, wherein when the vehicle is activated by a remote starter device configured to remotely activate the vehicle, the controller controls the air-conditioning device by switching the air-conditioning mode to the all-seat air-conditioning mode when the air-conditioning mode selected at previous turning-off of an ignition device is the individual air-conditioning mode, and controls the air-conditioning device by switching the all-seat air-conditioning mode to the individual air-conditioning mode after the air-conditioning device in the all-seat air-conditioning mode has made the vehicle cabin a desired temperature.

* * * * *